C. E. LOHR & E. HIPPLE.
BRAKE.
APPLICATION FILED JUNE 12, 1918.
1,292,824.
Patented Jan. 28, 1919.
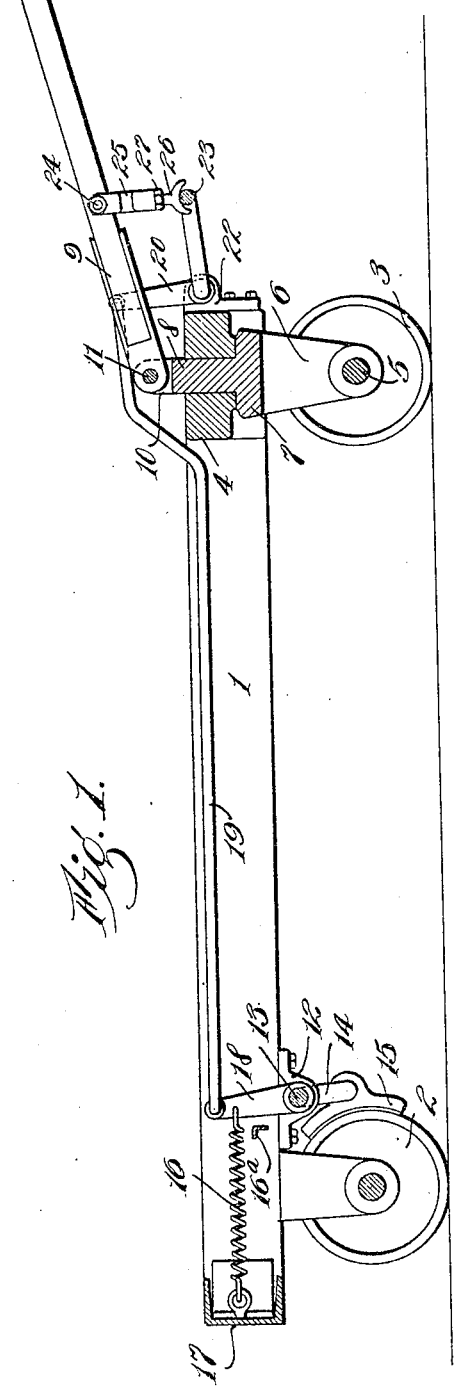
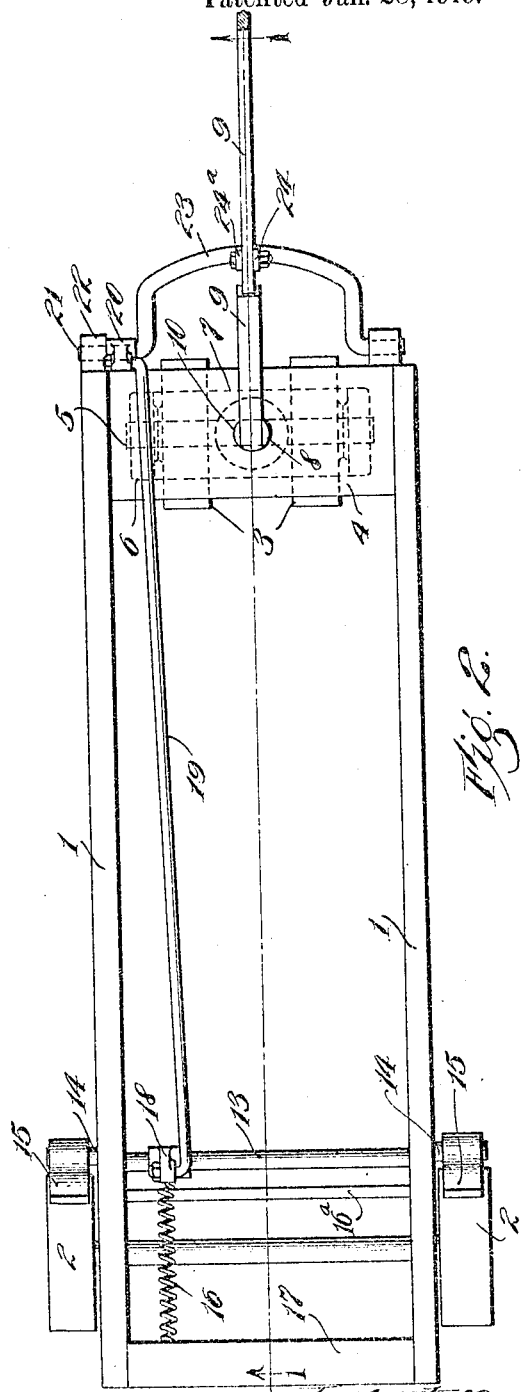
Inventors,
Chas. E. Lohr & Elmer Hipple.
By Hull, Smith, Buck & West,
Attys.

UNITED STATES PATENT OFFICE.

CHARLES E. LOHR AND ELMER HIPPLE, OF CLEVELAND, OHIO.

BRAKE.

1,292,824.  Specification of Letters Patent.  Patented Jan. 28, 1919.

Application filed June 12, 1918. Serial No. 239,602.

*To all whom it may concern:*

Be it known that we (1) CHARLES E. LOHR and (2) ELMER HIPPLE, citizens of the United States, residing at Cleveland, in the county of Cuyahoga and State of Ohio, have invented a certain new and useful Improvement in Brakes, of which the following is a full, clear, and exact description, reference being had to the accompanying drawings.

This invention relates more particularly to brakes capable of being automatically applied to the wheels of a vehicle through the operation of the draft appliance by which the latter is drawn, the draft appliance herein shown being a tongue.

It is the general purpose and object of the invention to provide a brake of this character which can be conveniently and effectively applied through such draft appliance and in part, at least, by the weight of such appliance. A further object of the invention is to provide a brake with connections whereby it may be conveniently operated from such draft appliance in any position of the said appliance and of the front or steering wheels of the vehicle. A still further object of the invention is to provide a brake (including the operating parts) which is simple of construction, economical of production, and which may be readily applied to various types of vehicles. We accomplish these objects in and through the embodiment of our invention illustrated in the drawings forming part hereof, wherein Figure 1 represents a longitudinal sectional view taken through a truck having our invention applied thereto and Fig. 2 a plan view of the truck and parts shown in Fig. 1.

Describing the various parts herein by reference characters, 1 denotes the side frames, 2 the rear wheels, 3 the front wheels, and 4 the bolster of a hand truck. The front wheels 3 are of the caster type, being mounted on a shaft 5 supported in downwardly extending brackets 6 carried by a top cross member 7 having a spindle 8 rotatably mounted in said bolster and projecting thereabove and constituting the pivot for said wheels. The upper end of the spindle 7 is slotted for the reception of the rear end of the tongue 9, which is pivoted to the lugs 10 formed by the slotting operation, as by means of the pin or stud 11.

Supported in bearings 12, shown as secured to the lower sides of the frame members 1, is a brake shaft 13, said shaft being of usual construction and provided with cranked arms 14 located outside of and beyond said side members and each carrying a brake shoe 15 adapted to engage a rear wheel. A spring 16 is connected to the rear frame member 17 of the truck and to an arm 18 rigid with the shaft 13 and projecting upwardly therefrom and normally rocks the shaft 13 in such manner as to hold the brake shoes away from their respective wheels, retaining the arm 18 against a stop 16ª. Connected with the upper end of the arm 18 is a rod 19 having its front end connected to the upper end of an arm 20 rigid with a crank shaft 21. The ends of the shaft 21 are journaled in suitable bearings 22, shown as secured to the front of the bolster. This shaft is provided with a central crank portion 23 extending nearly the full width of the truck, the cranked portion being curved on an arc described from the center of the spindle 8, and hence from the center of rotation of the tongue 9 and of the wheels 3.

Pivoted to the tongue 9, as by a bolt 24, is a thrust device, said device comprising an upper member 25 having a threaded bore extending upwardly from the bottom thereof and a forked member 26 threaded into said bore, a lock nut 27 being employed to secure the two members in adjusted position.

With the parts constructed and arranged as described, the operation will be readily understood. The crank shaft arm 18 will be so positioned with reference to the stop 16ª and the connections so arranged that the forked end of the thrust device will clear the cranked portion 23 of the shaft 21 under ordinary operating conditions; if necessary, the effective length of the thrust device may be shortened by adjustment of the member 26 to assist in securing this result. Moreover, the frictional clamp provided by the bolt 24 and the nut 24ª will enable the thrust device to be swung out of operative relation to the cranked portion of the shaft 21 and be retained in such inoperative position until it is desirable to operate the crank. When it is desired to apply the brakes, the lower end of the thrust device being in register with the curved crank 23, the brakes may be applied so as to exert considerable pressure upon the rear wheels by merely dropping the tongue. If this pressure is insufficient, the operator bears downwardly upon the outer portion of the tongue, thereby applying the brakes with the desired pressure to hold the truck. This operation is very readily effected, particularly where the truck is on an incline. Where such incline is not too steep, the weight of the tongue alone will be sufficient to hold the truck against gravity without requiring application of pressure by the operator or the addition of any weight to the tongue. Furthermore, when the truck is at rest on a substantially level surface, the tongue may be swung backwardly beyond its pivot 11 and allowed to remain in this position without affecting the brakes; or the same result may be obtained by merely swinging the thrust device 27 out of register with the crank 23 and allowing the tongue to drop.

Various changes in details of construction may, of course, be made without departing from the spirit of our invention; and we do not propose to limit ourselves to such details except as the same may be positively included in the claims hereto annexed or as we may be limited to such details by the state of the prior art.

Having thus described our invention what we claim is:—

1. The combination, with a vehicle, of a brake therefor, a traction device pivotally connected to the front of said vehicle, a thrust device connected to said traction device, and means operative by said thrust device for applying said brake, said means including a member projecting forwardly beyond the pivotal support for the traction device and normally disengaged from said thrust device and located below and in the line of movement of said thrust device and adapted to be engaged thereby when the traction device is lowered.

2. The combination, with a vehicle, of a brake therefor, a shaft carried at the front of said vehicle and having a cranked portion projecting forwardly therefrom, a brake operatively connected with said shaft, and a forwardly extending traction device pivoted to the vehicle behind said shaft and adapted to engage the cranked portion of said shaft to operate said brake.

3. The combination, with a vehicle, of a brake therefor, a shaft carried by the front portion of said vehicle and having a cranked portion, a pivoted traction device for said vehicle, a thrust device pivotally carried by said traction device and projecting downwardly therefrom and adapted to engage the cranked portion of said shaft and connections between said shaft and said brake for operating the latter.

4. The combination, with a vehicle, of a brake therefor, a shaft carried by the front portion of said vehicle and having a projection, a pivoted traction device for said vehicle, an extensible and contractible thrust device carried by said traction device and projecting downwardly therefrom and adapted to engage the projection of said shaft, and connections between said shaft and said brake for operating the latter.

5. The combination, with a vehicle, of a wheel pivotally connected to said vehicle, a brake for said vehicle, a traction device pivotally connected to the pivot for said wheel, a shaft carried by the front portion of said vehicle and having a cranked portion curved substantially concentric with the pivot for such wheel, a thrust device connected to said traction device and having a forked end adapted to engage the curved cranked portion of said shaft, and operative connections between said shaft and said brake.

6. The combination, with a vehicle, of a wheel pivotally connected to said vehicle, a brake for said vehicle, a traction device pivotally connected to the pivot for said wheel, a shaft carried by the front portion of said vehicle and having a cranked portion curved substantially concentric with the pivot for such wheel, a thrust device comprising a pair of relatively adjustable members one of which is pivotally connected to the traction device and the other of which is provided with a forked end adapted to engage the cranked portion of said shaft in varying positions of said wheel about its pivot, means for retaining said thrust device in various adjusted positions about its pivotal connection with said traction device, connections between said shaft and said brake for setting or applying the latter, and a spring operatively connected with said brake and tending to hold the same in inoperative position.

7. The combination, with a vehicle, of a brake for said vehicle, a traction device pivotally connected to said vehicle, a shaft carried by the front portion of said vehicle and having a projection substantially concentric with the pivot for such wheel, a thrust device comprising a pair of relatively adjustable members one of which is pivotally connected to the traction device and the other of which is provided with a forked end adapted to engage the projection of said shaft in varying positions of said wheel about its pivot, means for retaining said thrust device in various adjusted positions about its pivotal connection with said traction device and connections between said shaft and said brake for setting or applying the latter.

8. The combination, with a vehicle, of a brake therefor, a traction device pivotally connected to the front of said vehicle, a thrust device pivotally connected to said traction device, and means operative by said thrust device for applying said brake, said means including a member located in front of the pivot of said traction device and normally disengaged from said thrust device and located below said thrust device and adapted to be engaged thereby when the traction device is lowered.

In testimony whereof, we hereunto affix our signatures.

CHAS. E. LOHR.
ELMER HIPPLE.

Witnesses:
H. A. GREENAWAY,
E. JOHNSON.

Copies of this patent may be obtained for five cents each, by addressing the "Commissioner of Patents, Washington, D. C."